United States Patent [19]

Vaca

[11] 3,942,427

[45] Mar. 9, 1976

[54] EGG AID

[76] Inventor: Humberto Vaca, 11874 College, Detroit, Mich. 48205

[22] Filed: Dec. 5, 1974

[21] Appl. No.: 529,809

[52] U.S. Cl. .................. 99/571; 99/580; 215/100.5
[51] Int. Cl.² ...................... A23N 5/06; A47J 43/00
[58] Field of Search ..................... 99/568, 571, 580; 30/120.1; 220/72, DIG. 5, DIG. 6; D7/59, 60, 64; 15/257.06; 215/100.5

[56] References Cited
UNITED STATES PATENTS

| 2,827,936 | 3/1958 | Furphy | 99/580 |
| 3,179,322 | 4/1965 | Larson | 99/568 X |

FOREIGN PATENTS OR APPLICATIONS

| 112,401 | 2/1968 | Norway | 15/257.06 |

*Primary Examiner*—Stanley N. Gilreath
*Assistant Examiner*—Alan Cantor
*Attorney, Agent, or Firm*—Barnes, Kisselle, Raisch & Choate

[57] ABSTRACT

A receptacle has an end wall with an upper edge against which to crack eggs. The bottom of the receptacle extends beyond the end wall to form a shelf to catch egg drippings which fall outside of the receptacle. Side walls of the receptacle also extend beyond the end wall to form reinforcing gussets for the shelf. The opposite end wall is sloped and cooperates with the side walls to form an egg-delivery chute. A rib projects outwardly of the chute to pivotally engage the lip of a vessel to which eggs are delivered when the receptacle is tilted.

11 Claims, 4 Drawing Figures

EGG AID

This invention relates generally to a kitchen utensil for use in cracking the shells of eggs and transferring the eggs to a cooking vessel, or the like. More particularly, the present invention comprises an improvement over the utensil disclosed and claimed in my copending application Ser. No. 396,226 filed Sept. 11, 1973 and entitled "Egg Aid."

The object of the present invention is to provide an egg cracking device and transferring receptacle which is of improved simplicity to facilitate low cost of manufacture and which nevertheless is improved in its mode of use with respect to safety, convenience, tidiness and reduction in the number of broken yolks in the course of transferring eggs to a cooking vessel, or the like.

One form of the invention is shown in the accompanying drawings.

Figure 1:
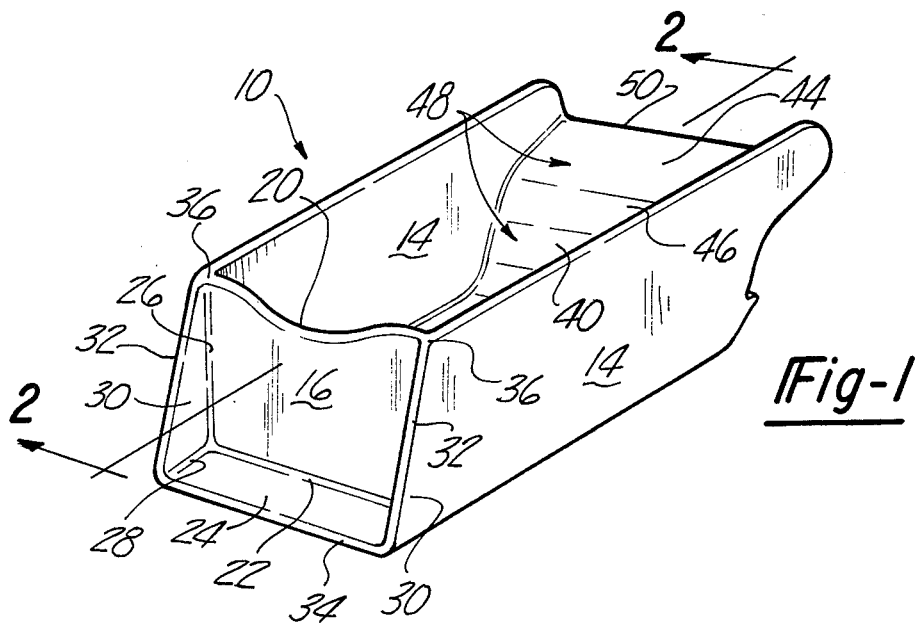
FIG. 1 is a perspective view of a utensil according to the present invention.
Figure 2:
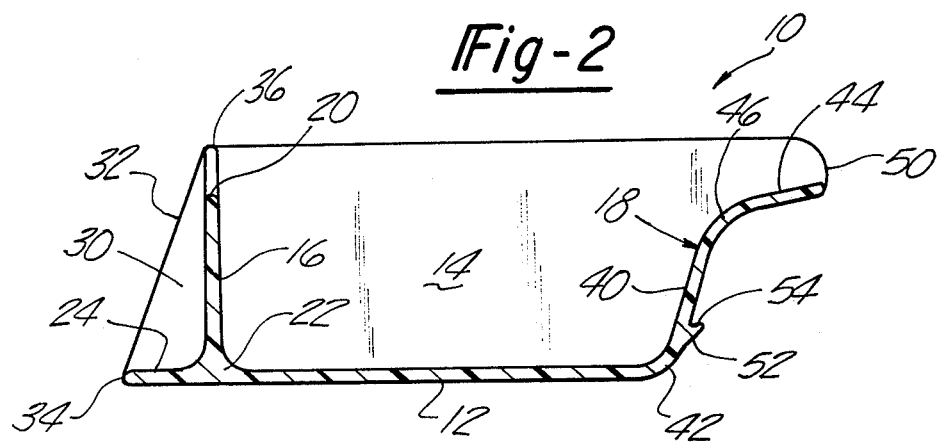
FIG. 2 is a sectional view on line 2—2 of FIG. 1.
Figure 3:
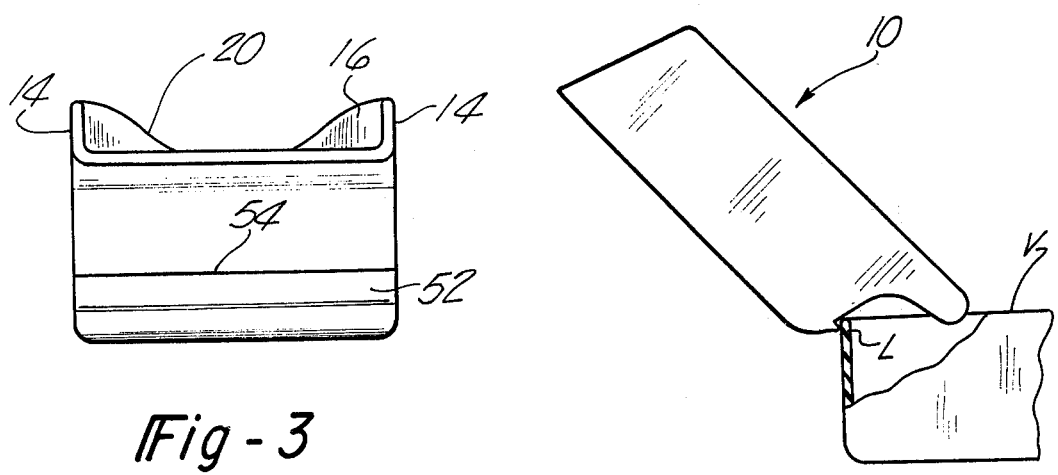
FIG. 3 is a front end elevational view of the utensil.

Shown in the drawings is a utensil 10 according to the present invention. The utensil comprises a receptacle having a substantially flat bottom 12, laterally spaced side walls 14 and longitudinally spaced end walls 16, 18. The side walls and end walls arise substantially vertically from bottom 12. Side walls 14 are substantially parallel to one another and are substantially perpendicular to end wall 16.

End wall 16 has an upper edge 20 which provides a surface against which egg shells may be struck for cracking. Surface 20 is preferably upwardly concave as illustrated. Bottom 12 extends longitudinally beyond its juncture 22 with end wall 16 to form a shelf 24 outside of the receptacle and disposed beneath surface 20. Side walls 14 also project longitudinally beyond their junctures 26 with end wall 16 and adjoin the sides of shelf 24 at 28 to form gussets 30 between the shelf and end wall 16. The end edges 32 of the gussets extend upwardly at an angle from the free edge 34 of shelf 24 to the upper side edge portions 36 of end wall 16.

Wall 18 has a lower portion 40 which adjoins bottom 12 at 42 and which extends upwardly and away from end wall 16 at a relatively steep slope. End wall 18 has an upper portion 44 which adjoins lower portion 40 in a curved juncture 46, upper portion 44 extending upwardly and away from end wall 16 at a slope which is less than that of lower wall portion 40. Side walls 14 adjoin and cooperate with end wall portions 40, 44 to form a chute generally indicated at 48 (FIG. 1) having an open end 50.

Figure 4:
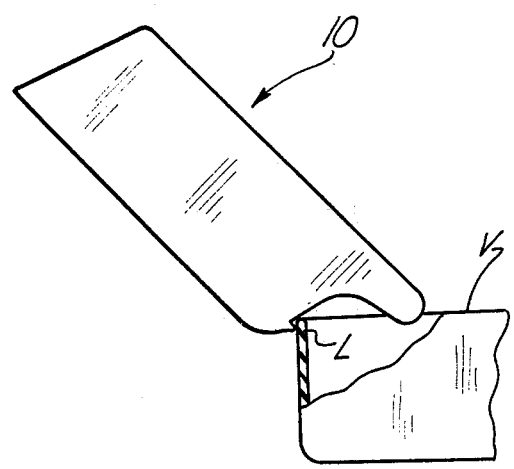
FIG. 4 is a side elevational view partly in section illustrating an egg-transferring use of the utensil.

Lower portion 40 of end wall 18 is provided with an outwardly projecting external rib 52 generally adjacent its juncture 42 with bottom 12. Rib 52 has an upwardly disposed surface 54 contoured and dimensioned to be pivotally abutted against an upper lip or edge L of a cooking vessel V, or the like, FIG. 4.

In use, bottom 12 of utensil 10 is simply rested upon any convenient surface such as a table or counter top. To crack an egg shell, it is struck against upper surface 20 of end wall 16, the upward concavity of this surface tending to increase the peripheral extent of the crack around the shell. The egg is then held over the receptacle between its side and end walls and broken open to release the contents into the receptacle.

During the process of cracking the shell against surface 20, some of the relatively fluid egg white frequently drips and runs down the inner and outer sides of end wall 16. This is inconsequential as to that part of the egg white that runs down into the receptacle. However, it would be consequential as to that part of the egg white which runs down the outside of end wall 16 because it would create a certain amount of untidiness or mess on the table or counter top beneath utensil 10. Shelf 24, however, being disposed beneath surface 20, catches such external drippings and abates or eliminates this untidy nuisance.

To transfer the contents of receptacle 10 into a vessel V, or the like, edge 54 of rib 52 is simply abutted against the upper lip or edge L of the vessel, and the opposite end of receptacle 10 is lifted. This results in a pivotal movement of the entire receptacle about the interengaged rib and lip and consequent upward tilting of bottom 12. The egg or eggs in the receptacle first slide downwardly until they reach lower portion 40 of end wall 18 which forms a shelf which momentarily arrests their downward movement. This occurs, for example, when receptacle 10 is in about the position of FIG. 4. Upon further upward tilting, the eggs slide over juncture 46 and upper portion 44 of end wall 18 and then outwardly through open end 50 into vessel V.

This mode of transferring the eggs is very convenient. All one need do is, by the use of one hand, abut rib surface 54 against lip L, and tilt receptacle 10 upwardly. Several benefits flow from this convenience. First of all, the user is induced to position the receptacle immediately adjacent the top of vessel V during the transferring procedure so that the egg falls only a short distance into vessel V, thus reducing the number of yolks broken in the fall. Moreover, the user is induced to utilize the arresting effect of lower wall portion 40 of end wall 18 which reduces the velocity at which eggs enter vessel V, thereby further reducing the number of egg yolks broken in the transfer process.

Perhaps more importantly, the user is induced to keep his hand away from the open top of vessel V which may contain, for example, spattering grease thereby minimizing the danger of injury to the user.

Alternatively to a single, continuous, laterally extending rib 52, a series of projections could be employed. Such series of projections might, for example, comprise merely two or three projections distributed across the outer face of end wall 18. The single continuous rib 52 is preferred, however, to facilitate manufacture and to provide maximum resistance to wear and adequate lateral stability of receptacle 10 during the egg transfer procedure.

Gussets 30 reinforce shelf 24 and protect it from accidental damage or fracture which it might otherwise sustain, for example, should receptacle 10 be dropped. The slope of edges 32 of the gussets insures convenient access to shelf 24 to facilitate removal of any egg drippings which it may receive. This slope also generally approximates that of lower portion 40 of end wall 18, and thus improves the esthetic appearance of the receptacle.

Utensil 10 can be molded by conventional commercial molding procedures from a single integral body of any one of a number of commercially available plastics such as polycarbonate or nylon. The utensil can thus be very inexpensively made.

I claim:

1. A kitchen utensil for cracking eggs and transferring them to a cooking vessel, or the like, comprising,
a receptacle defined by a bottom, laterally spaced side walls and longitudinally spaced end walls extending upwardly from junctures with said bottom wall,
one of said end walls having an upper edge portion which forms a surface against which eggs may be struck for cracking,
said bottom having a portion which extends longitudinally beyond its juncture with said one end wall and forms a shelf outside of said receptacle and below said upper edge portion for catching egg drippings,
the other end wall and said side walls having portions which cooperate to define a chute having an open end for slidable delivery of eggs from said receptacle responsive to tilting said receptacle,
said other end wall having laterally extending rib means on its exterior dimensioned and contoured to pivotally engage an upper surface portion of a vessel to facilitate egg-delivery tilting of said receptacle relative to such vessel.

2. The structure defined in claim 1 wherein said side walls project longitudinally beyond said one end wall and form extensions outside of said receptacle which adjoin the sides of said shelf.

3. The structure defined in claim 2 wherein said shelf has a free end which extends between said sides thereof, said extensions having sloped free edges which extend at a substantially like angle upwardly from said edge of said shelf to said upper edge of said one end wall.

4. The structure defined in claim 3 wherein said egg cracking surface is upwardly concave.

5. The structure defined in claim 3 wherein said other end wall has a first portion which adjoins said bottom and extends upwardly along a slope in a direction away from said one end wall,
said other end wall having a second portion which adjoins said first portion and which extends upwardly and away from said one end wall along a slope which is less than that of said first portion, and laterally extending rib means on the exterior of said first portion dimensioned and contoured to pivotally engage an upper surface portion of a vessel to facilitate egg-delivery tilting of said receptacle relative to such vessel.

6. The structure defined in claim 5 wherein said bottom is substantially flat, said side walls and one end wall extending substantially vertically from said bottom, said side walls being substantially parallel to one another and substantially perpendicular to said one end wall.

7. The structure defined in claim 6 wherein said receptacle is formed integrally of a single body of moldable plastic material.

8. The structure defined in claim 1 wherein said other end wall is sloped upwardly from its juncture with said bottom and away from said one end wall.

9. The structure defined in claim 1 wherein said other end wall has a first portion which adjoins said bottom and which extends upwardly at a relatively steep slope, said other end wall having a second portion which adjoins said first portion thereof and which extends upwardly along a lesser slope than that of said first portion, said rib means projecting outwardly from said first portion.

10. The structure defined in claim 9 wherein said rib means comprises a single rib which extends laterally continuously across said first end wall portion between the sides of said receptacle.

11. A kitchen utensil for cracking eggs and transferring them to a cooking vessel, or the like, comprising,
a receptacle defined by a bottom, laterally spaced side walls and longitudinally spaced end walls extending upwardly from junctures with said bottom wall,
one of said end walls having an upper edge portion which forms a surface against which eggs may be struck for cracking,
the other end wall and said side walls having portions which cooperate to define a chute having an open end for slidable delivery of eggs from said receptacle responsive to tilting said receptacle,
said other end wall having laterally extending rib means on its exterior dimensioned and contoured to pivotally engage an upper surface portion of a vessel to facilitate egg-delivery tilting of said receptacle relative to such vessel.

* * * * *